Oct. 26, 1971 E. GELBMAN 3,615,155

RECORDING TAPE CARTRIDGE

Filed March 26, 1969 2 Sheets-Sheet 1

INVENTOR
EMERY GELBMAN
BY Stanley Wolder
ATTORNEY

Oct. 26, 1971 E. GELBMAN 3,615,155

RECORDING TAPE CARTRIDGE

Filed March 26, 1969 2 Sheets-Sheet 2

INVENTOR
EMERY GELBMAN
BY Stanley Wolder
ATTORNEY 3,615,155

RECORDING TAPE CARTRIDGE

Emery Gelbman, 90 Squirrel Lane, Levittown, N.Y. 11756

Filed Mar. 26, 1969, Ser. No. 810,745
Int. Cl. G11b *15/08, 23/06, 23/10*
U.S. Cl. 242—188 9 Claims

ABSTRACT OF THE DISCLOSURE

A magnetic type cartridge includes a casing which houses an endless tape having a storage section wound on a spool or a double ended tape extending between a pair of spools, the tape having one or more transparent control sections and advancing about a tubular guide post. The post has a side opening aligned with a casing end opening, an open end registering with an opening in the casing top wall, and a reflector or prism surface inclined to direct light from one opening to the other. A lamp registers with each end opening and a photoconductor registers with each top wall opening. Networks are provided which are responsive to the photoconductor to control the tape drive.

BACKGROUND OF THE INVENTION

The present invention relates generally to improvements in recording devices and it relates particularly to an improved automatically controlled magnetic tape cartridge.

In the use of magnetic recording tapes and the like it is frequently desirable to sense certain sections of the tape, for example the beginning or end thereof, whereby to automatically stop or reverse the tape advance or to shift the pickup to a successive channel. Many arrangements and systems have been employed and proposed to sense precoded sections of a magnetic recording tape but these possess numerous drawbacks and disadvantages. These have been complicated and expensive devices which were generally unreliable and of limited application. Thus the earlier tape sensing systems are not practical for employment with conventional magnetic tape cartridges of various types which are in widespread and popular use since they are either inoperative with these cartridges or are excessively complex and inflexible and not practically applicable thereto.

SUMMARY OF THE INVENTION

It is thus a principal object of the present invention to provide an improved recording device.

Another object of the present invention is to provide an improved magnetic tape cartridge type recording device. Still another object of the present invention is to provide an automatically controlled magnetic tape cartridge type recording device.

A further object of the present invention is to provide an improved magnetic tape cartridge having means for optically sensing predetermined sections of the tape.

Still a further object of the present invention is to provide an improved device of the above nature characterized by its reliability, simplicity, low cost, compactness, versatility and adaptability.

The above and other objects of the present invention will become apparent from a reading of the following description taken in conjunction with the accompanying drawing which illustrates a preferred embodiment thereof.

In a sense the present invention contemplates the provision of a recording tape device comprising a casing having light transmitting inlet and outlet windows, a guide post located in said casing and provided with means for directing light entering said inlet window along a path toward said outlet window, and a record tape located in said casing and extending about said post and intersecting said light path between said windows, said tape having a light transparent section in a predetermined area.

In its preferred form the casing is of general conventional configuration including top and bottom rectangular walls and side, front and rear walls, the front wall having a long opening for access to the magnetic recording tape by the drive capstans and magnetic heads. A pair of vertical tubular guide posts are positioned proximate the casing front corners and a pair of longitudinally spaced internally splined spools extend between and are journalled to the top and bottom walls. The magnetic tape is provided with transparent tails and is wound about and extends between the spools about the guide posts and along the casing front wall. Aligned inlet openings are formed in the casing end walls and the respective confronting walls of the tubular guide posts and lamps are located adjacent the end wall openings to direct light therethrough into the tubular guide. Inclined reflectors are located in the tubular posts and reflect the incoming light through the open ends of the posts into photoconductors confronting these open ends, the photoconductors controlling the tape advance through suitable networks. The tape traverses a path across the side openings in the guide posts so that any change in the light transmission properties theerof is sensed by the photoconductors for control purposes.

The improved arrangement can be applied to any magnetic cartridge whether of the double ended or endless type with only minor physical modification thereof and the sensing system is simple, reliable and inexpensive.

DESCRIPTION OF THE PREFERRED EMBODIMENT

Figures 1, 2:
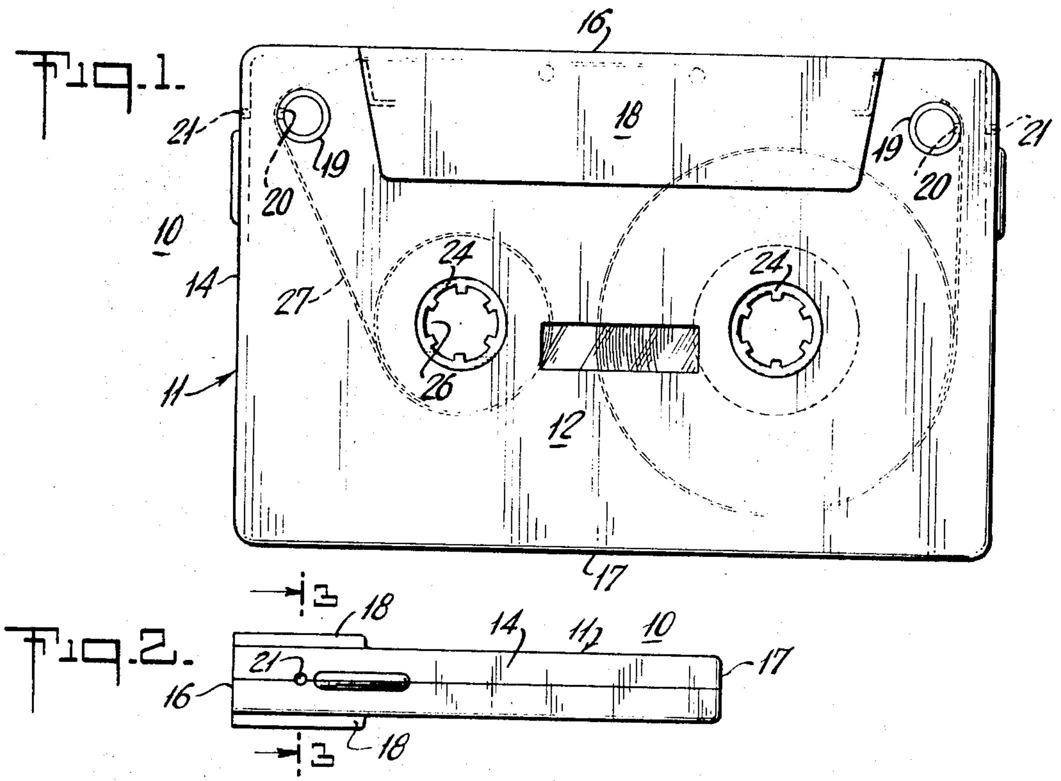
FIG. 1 is a top plan view of a magnetic tape cartridge embodying the present invention.
FIG. 2 is an end elevational view thereof.
Figure 3:
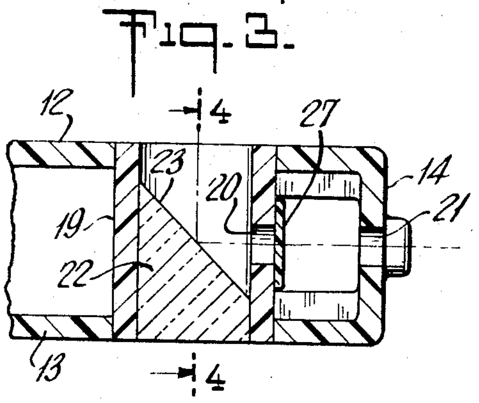
FIG. 3 is an enlarged fragmentary sectional view taken along line 3—3 in FIG. 2.
Figure 5:
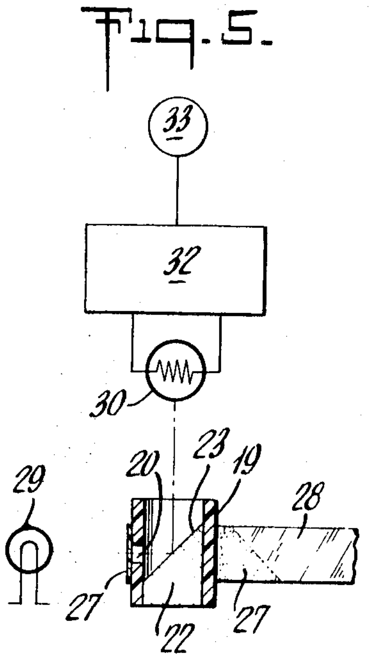
FIG. 5 is a diagrammatic and schematic view of the improved cartridge and control network.
Figure 4:
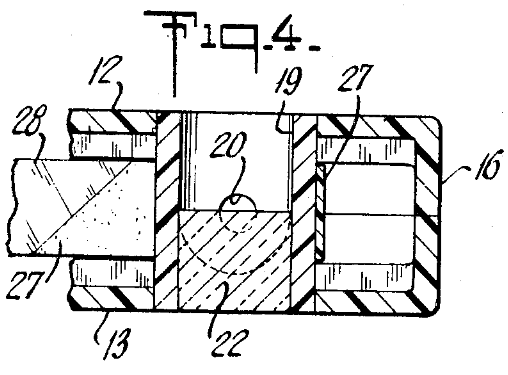
FIG. 4 is a sectional view taken along line 4—4 in FIG. 3.
Figure 6:
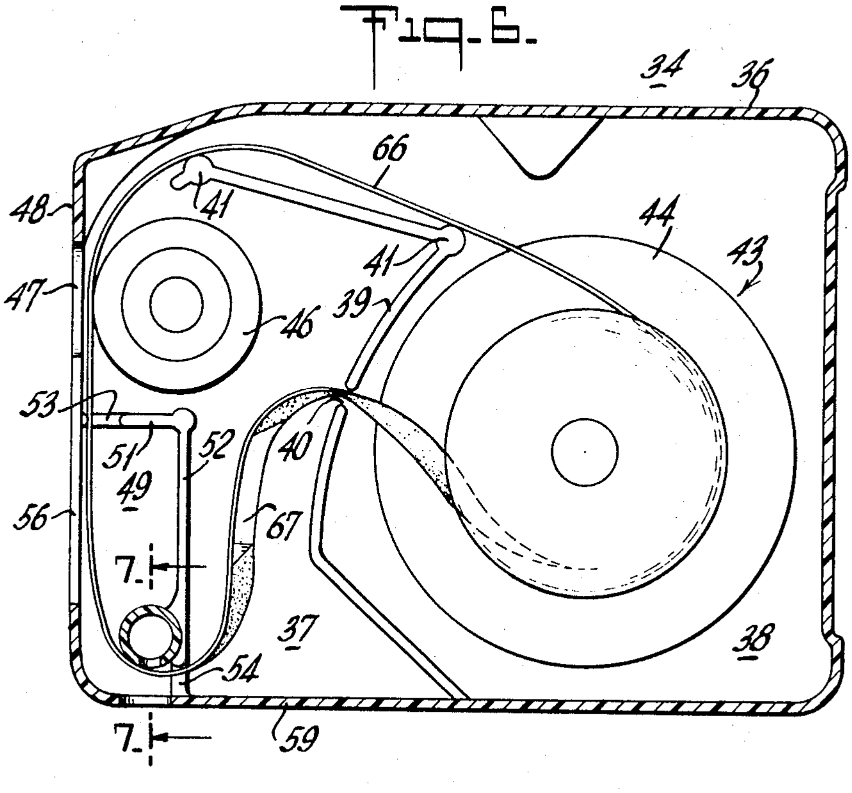
FIG. 6 is a medial horizontal sectional view of another embodiment of the present invention.
Figure 7:
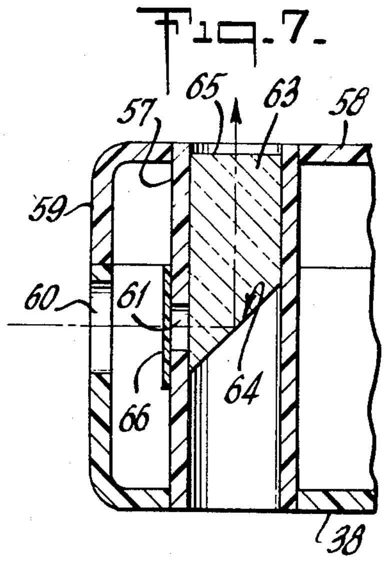
FIG. 7 is an enlarged sectional view taken along line 7—7 in FIG. 6.

Referring now to the drawings, and particularly FIGS. 6 and 7 thereof, which illustrate a preferred embodiment of the present invention, the reference numeral 10 generally designates an improved magnetic tape cartridge in accordance with the present invention and which comprises a relatively flat casing 11 of substantially conventional configuration. The casing 11 is formed of plastic material and includes rectangular parallel similar top and bottom walls 12 and 13 respectively, opposite end walls 14, and front and rear walls 16 and 17 respectively. The top and bottom walls 12 and 13 are provided with raised sections 18 along their front border and the front wall 16 is provided, in the known manner, with longitudinally spaced openings for the reception of tape drive capstans and for providing access to the tape by magnetic heads, suitable guides being provided in suitably spaced relationship to these openings.

Positioned in the front corners of the casing 11 proximate to and spaced from the end and front walls 14 and 16 are a pair of vertical, tubular, cylindrical, open ended tape guide posts 19, the ends of which tightly engage corresponding circular openings formed in the top and bottom walls 12 and 13 and are suitably secured thereto. A small aperture 20 is formed in the wall of each tubular guide post 19 confronting a corresponding end wall 14 and located intermediate the ends of the guide post 19. An aperture 21 is formed in each end wall 14 in longitudinal alignment with a respective proximate aperture 20.

A light deflecting reflector member 22 defined by a rigid plastic cylindrical plug is affixed in the lower section of each guide post 19. The reflector member 22 includes a 45° inclined top reflector surface of face 23 facing the aperture 20 and the top open end of the respective guide post 19. Thus, light entering through apertures 20 and 21 is reflected by the face 23 through the open top end of the tubular guide post 19.

A pair of longitudinally spaced medially located, vertical, rotatable spools 24 are located in the casing 11 and are journalled between the casing top and bottom wall 12 and 13. The spools 24 are provided with longitudinally splined or ribbed axial bores 26 which register with corresponding openings in the top and bottom walls 12 and 13 to permit the driving engagement of the spools 24 by matng drive spindles in the known manner.

A magnetic recording tape 27 of conventional construction is housed in the casing 11, opposite sections thereof being wound upon the spools 24. The tape 27 traverses a path extending from one of the spools 24 about the outer face of the adjacent guide post 19, along the inner face of the casing front wall 16 as maintained there-along by associated guide surfaces, about the outer face of the opposite guide post 19 and thence to the other spool 24. The tape 27 in its path about the guide posts 19 covers the post apertures 20. The recording tape 27 is substantially opaque along the main portion thereof but terminates in substantially transparent end sections or tails 28 of lengths somewhat greater than the distance between a spool 26 and a corresponding guide post 19.

Positioned externally of the cartridge 10 and carried by the associated recording instrument are suitably energized electric lamps 29 which are proximate the apertures 21 in alignment with the apertures 20 and 21 when the cartridge 10 is in its operative position in the associated recording instrument. Photosensitive elements, such as photoconductors 30 are also associated with the recording instrument and are positioned adjacent to and confront the open top ends of the guide posts 19 when the cartridge 10 is in its operative position so as to be exposed to light from the lamps 29 traversing the apertures 20 and 21 and reflected by the reflector faces 23.

The photoconductor 30 is connected to the control input of any suitable switching network of known construction the output of which controls the motor 33 or any suitable electrically actuated clutch associated with the tape drive or advancing mechanism. The network 32 is such as to deactuate the tape drive upon a drop in the resistance of the photoconductor 30 below a predetermined value.

Considering now the operation of the improved recording device described above the cartridge 10 is inserted in an associated magnetic tape recording or playback machine and the tape drive is initially actuated independently of the network 32 until the opaque tape portion 27 covers the guide post apertures 20 at which time the network 32 is permitted to take control. Since the light from the lamps 29 toward the reflecting members 22 is intercepted by the opaque tape sections the photoconductors 30 are unexposed and of such high resistance as to maintain the tape drive actuated. However, when a transparent tail 28 reaches a guide post 19 it permits the passage of light from the lamp 29 through an aperture 20 which light is reflected by surface 23 to a photoconductor 30 to reduce the resistance thereof and control the network 32 to automatically deactuate the tape drive. The tape drive can be reversed in the known manner with the momentary by-passing of control network 32.

In FIGS. 6 and 7 of the drawing there is illustrated another embodiment of the present invention which differs from that first described primarily in its application to an endless tape type of cartridge and the use of an internally reflecting prism instead of the member 22 provided with the external reflecting surface 23. Specifically the improved cartridge 34 includes a casing 36 of generally conventional construction divided into a pair of compartments 37 and 38 by a separating partition 39. The partition 39 is provided with a vertical medial guide slot 40 and has vertical guide rods 41 integrally formed therewith.

Rotatably supported in compartment 38 by a vertical post 42 is a spool 43 having an enlarged lower flange 44. A rubber covered idler roll 46 is rotatably supported in a corner of compartment 37 and registers with an opening 47 in casing end wall 48, the opening 47 providing access to a drive capstan in the known manner. The corner of compartment 37 opposite roll 46 is subdivided into a corner compartment 49 by longitudinal and transverse panels 51 and 52 respectively, the panels having vertical guide slots 53 and 54 respectively formed therein adjacent to the casing end and front walls 48 and 59. An opening 56 is formed in casing end wall 48 providing access to compartment 49 by a magnetic head.

A vertical open ended tubular guide post 57 is located in compartment 49 along partition 52 and adjacent to guide slot 54, the ends of the guide post 57 registering with mating openings formed in the top and bottom walls 58 and 38 of casing 36. The casing front wall 59 has a vertically medially located aperture 60 communicating with compartment 49 adjacent to guide slot 54 and guide post 57 has an aperture 61 formed therein transverse alignment with aperture 60.

Nesting in the guide post 57 is a reflecting member 63 which is formed of a clear transparent material preferably a polymeric resin such as polystyrene or the like. The reflecting member 63 is of cylindrical configuration with its inside end surface 64 planar and inclined at an angle of 45° to the guide post axis. The inside end surface 64 is directed toward apertures 60 and 61 and along the axis of guide post 57 so that light entering apertures 60 and 61 is internally reflected by surface 64 through an open end of guide post 57 and similarly, light directed onto the transverse end face 65 of member 63 through the end of guide post 57 is internally reflected by surface 64 through apertures 60 and 61. It should be noted that internal reflector member 63 may be substituted for reflector member 22 in the first described embodiment and reflector member 22 may be substituted for member 63.

A magnetic recording tape 66 is provided along its length with one or more longitudinally spaced transparent sections 67 and is endless and wound on the spool 43 in the known manner. The tape 67 under normal operating conditions is drawn from the inside of the stored tape winding on the spool 43 successively through slot 54, about guide post 57, in overlying relationship with aperture 61, along opening 56 where it is engaged by a magnetic head, through slot 53, along the periphery of roll 46 where it is engaged by a drive capstan, along guides 41 and to the outside of the tape wound on spool 43 where it is taken up by the spool 43 rotating clockwise as viewed in FIG. 6.

A photocell, light source and control network are associated with the cartridge 34 in the manner earlier described and the desired control is effected in response to the tape transparent section registering with aperture 51.

While there have been described and illustrated perferred embodiments of the present invention it is apparent that numerous alterations, omissions and additions may be made without departing from the spirit thereof. For example, not only may the tape drive be controlled but other operations such as channel switching and the like, and transparent tape control sections may be spaced between the tape ends as well as at the tape ends. Further, the light directing arrangement in the guide post may be of other constructions than that shown.

What is claimed is:

1. A recording device comprising a casing having light transmitting inlet and outlet windows, a guide post located in said casing and provided with means for directing light entering said inlet window along a path toward said outlet window, and a record tape located in said casing and extending about and slideably engaging said post and intersecting said light path between said windows, said tape having a light transparent section in an area proximate an end thereof.

2. The device of claim 1 wherein said casing includes top and bottom walls and a peripheral wall, and a first of said windows is located on one of said top and bottom walls and a second of said windows is located in said peripheral wall, said guide post being tubular and extending between said top and bottom walls and having an end opening registering with said first window and a side opening facing said second window, and said light directing means includes an inclined surface reflecting light entering one of said openings to the other of said openings, said tape traversing a path across said guide post side opening.

3. The device of claim 2 comprising means for advancing said tape, means for directing light through one of said windows toward a respective opening in said guide post, a photosensitive element exposed to light emerging from the other of said windows, and means responsive to said photosensitive element for controlling said tape advancing means.

4. The device of claim 1 including means for advancing said tape, a light source directed to said inlet window, a photosensitive element exposed to said outlet window and means responsive to said photosensitive element for controlling said tape advancing means.

5. The device of claim 4, including a pair of spools positioned in said casing, said tape being wound upon said spools and traversing a path between said spools about said guide post.

6. The device of claim 1 including a pair of said guide posts positioned in said casing, said casing having a pair of said inlet and outlet windows associated with each of said guide posts and each of said guide posts being provided with one of said light directing means, said tape being advanced along a path about each of said guide posts and intersecting a respective light path.

7. The device of claim 1 comprising a spool located in said casing, said tape being endless and including a stored section wound on said spool and a free loop section extending between the inside and outside ends of said stored section.

8. The device of claim 7 including an idler roll engaging the inside face of said loop section.

9. The device of claim 1 wherein said light directing means comprises a transparent internal reflecting member.

References Cited

UNITED STATES PATENTS

| | | | |
|---|---|---|---|
| 2,449,705 | 9/1948 | Jones | 242—200 |
| 2,952,416 | 9/1960 | Sampson | 242—188 |
| 3,438,591 | 4/1969 | Becker et al. | 242—55.19 (A) |

OTHER REFERENCES

Bosch: German printed application 1,254,377, pub. Nov. 16, 1967.

GEORGE F. MAUTZ, Primary Examiner

U.S. Cl. X.R.

242—55.19 A, 199